Dec. 29, 1953  W. G. VON WEISE  2,664,108
FLUID ACTUATED DIAPHRAGM FOR COLLET CHUCKS
Filed Feb. 14, 1949  2 Sheets-Sheet 1

INVENTOR
WILLIAM G. VON WEISE
BY *Alfred W. Petraitis*
ATTORNEY

Dec. 29, 1953 W. G. VON WEISE 2,664,108
FLUID ACTUATED DIAPHRAGM FOR COLLET CHUCKS
Filed Feb. 14, 1949 2 Sheets-Sheet 2

INVENTOR
WILLIAM G. VON WEISE
BY
ATTORNEY

Patented Dec. 29, 1953

2,664,108

UNITED STATES PATENT OFFICE 2,664,108

FLUID ACTUATED DIAPHRAGM FOR COLLET CHUCKS

William G. von Weise, St. Louis, Mo.

Application February 14, 1949, Serial No. 76,268

9 Claims. (Cl. 137—784)

1

This invention relates in general to collet chuck actuators and, more particularly, to a fluid driven actuator for tightening and releasing collet chucks and analogous work-holding devices used in machine tools.

In various types of machine tools such as gear-hobbing machines, gear-grinding machines, turret lathes, and the like, it is conventional practice to mount the work in a collet chuck, or similar device, which consists of a split sleeve having a tapering or conical end that fits into a seat of corresponding taper so that lengthwise movement of the collet causes a contraction or expansion of gripping members in which the work is held. Frequently, the collet chuck is mounted in some type of rotating arbor, spindle, or head-stock so that the collet and work gripped thereby may be rotated relative to the cutting tool, grinder or hobbing cutter, which is used to form the work.

Quite often during operation collet chucks tend to become wedged tightly in the seat as the work progresses, and cannot be dislodged by normal means. The machine tool operator, after turning a wheel which disengages the draw bolt, is forced to tap the draw bolt and collet forwardly in order to release the work. This cumbersome step requires a stoppage of the machine. Thus, a considerable amount of valuable time on the part of a highly skilled worker is unnecessarily consumed in such procedure.

It is, hence, a primary object to the present invention to provide a fluid driven actuator which may be conveniently installed upon the rotating work arbor, spindle, or head-stock of a machine tool for quickly releasing and tightening collet chucks or similar work-holding devices, without stoppage of the machine.

It is a further object of the present invention to provide a fluid driven actuator of the diaphragm type, which is reliable in operation and economical in construction.

It is an additional object of the present invention to provide a fluid driven actuator having means for readily adjusting the collet chuck or other work-holding device with relation to the spindle whereby the distance traversed between tightened and released position may be regulated for any particular machine.

It is a further object of this invention to provide a fluid driven actuator capable of rotating with the work and having a stationary manifold which does not materially retard the rotation of work-holding device.

It is a further object of this invention to pro-

2 vide a fluid driven actuator which will permit the changing of collets of varying sizes in a minimum of time and without removing the cylinder and draw bolt attached thereto from the machine.

With the above and other objects in view, my invention resides in the novel features of form, construction, arrangement, and combination of parts presently described and pointed out in the claims.

In the accompanying drawings (two sheets)—

Figures 1, 2:
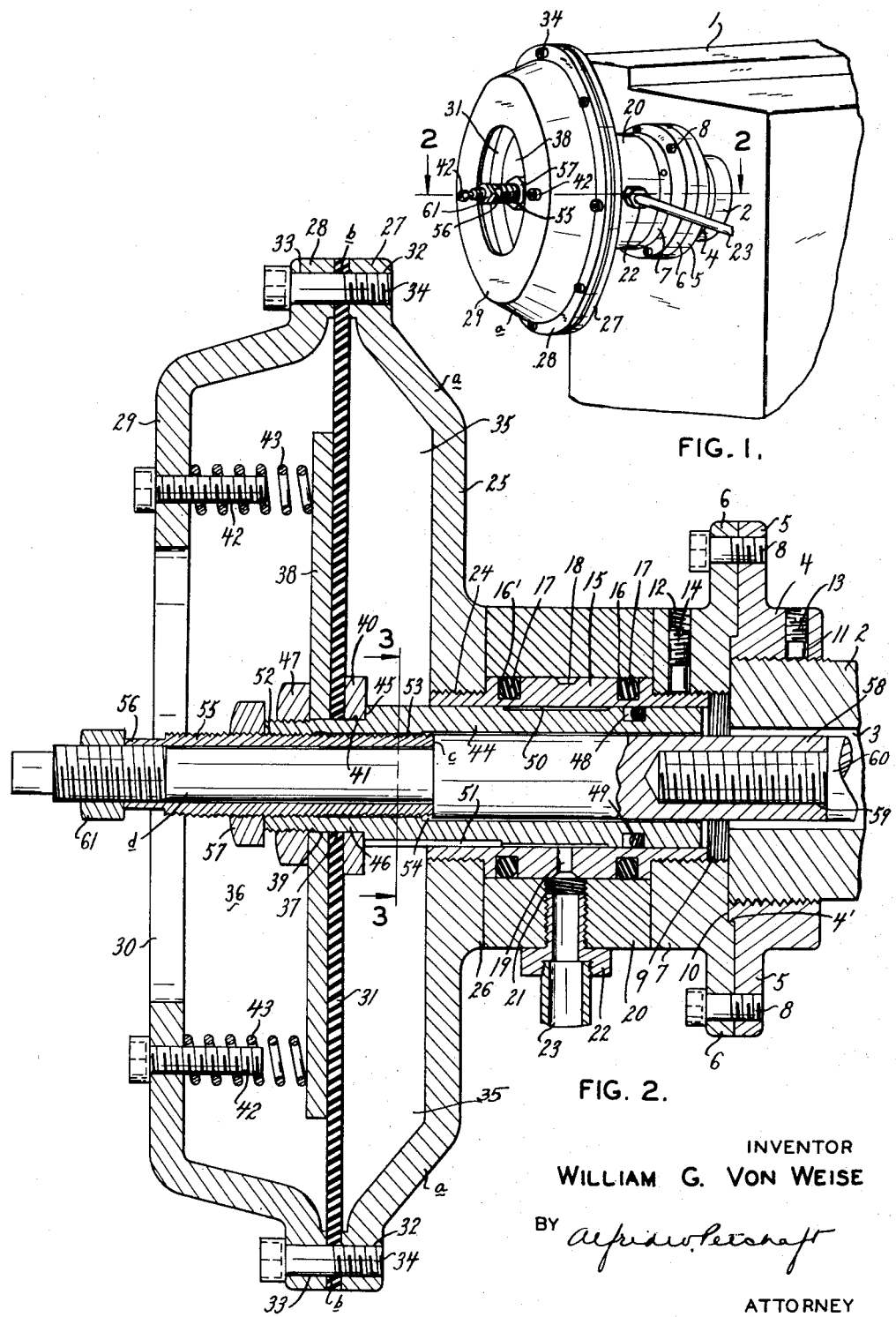
Figure 1 is a fragmentary perspective view of a collet chuck actuator constructed in accordance with and embodying the present invention.
Figure 2 is a longitudinal sectional view taken along line 2—2 of Figure 1.
Figure 3:
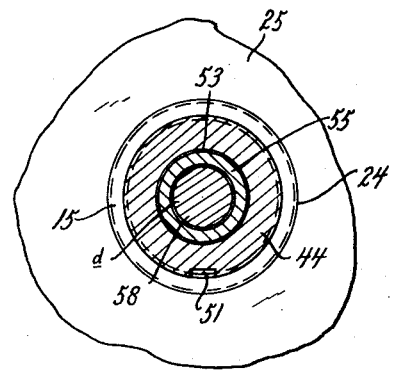
Figure 3 is a transverse sectional view taken along line 3—3 of Figure 2.
Figure 4:
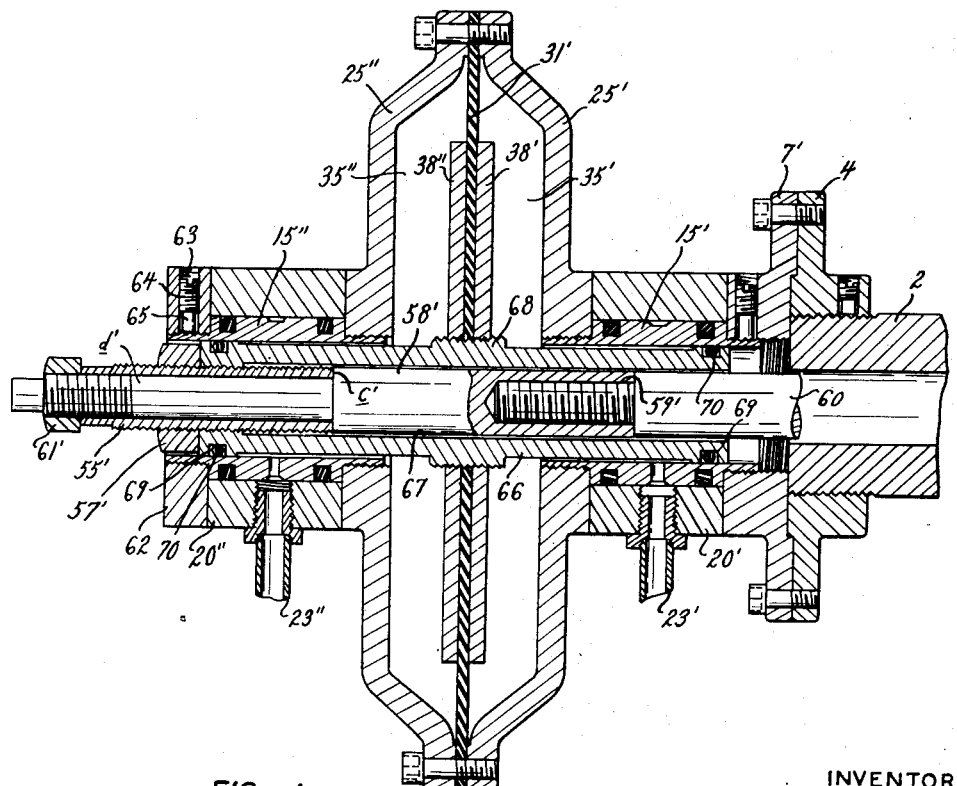
Figure 4 is a longitudinal sectional view of a modified type of collet chuck actuator constructed in accordance with and embodying the present invention.

Referring now in more detail to the drawings which illustrate practical embodiments of my invention, I designates the head-stock of a hobbing machine, gear-cutting machine, or the like, provided with a rotatable spindle 2, operated by conventional means (not shown). Said spindle 2 is provided with an axial bore 3 and is externally threaded on its rearward or left end (reference being made to Figure 2) for engagement with an adapter collar 4 which is integrally provided with an annular boss 4' and a peripheral flange 5, having suitable apertures in alignment with registering apertures in a flange 6 of an adapter collar 7 secured thereto by bolts 8. The collar 7 is provided with an internally threaded central aperture 9 axially aligned with, but of larger diameter than, the bore 3 of the spindle 2. In the forward face of the collar 7, concentric with said aperture 9, is an annular recess 10 for snug fitting engagement with the boss 4' of the adapter collar 4. Each of the collars 4, 7, is suitably provided with radial apertures 11, 12 respectively, for threadedly receiving set screws 13, 14 respectively.

Threaded into the aperture 9 is the forward end of a tubular connecting shaft 15 the bore of which is axially aligned with the bore 3 of the spindle 2. The central portion of the shaft 15 is relatively thickened and is provided with a pair of spaced, annular grooves 16, 16' extending inwardly from its outer surface. Disposed within each of the grooves 16, 16' is a gasket 17 of the so-called O-ring type. Located intermediate the grooves 16, 16' is a shallow annular recess 18 connected by a radial passage 19 with the bore of the shaft 15.

Externally slip-fitted upon the shaft 15 for relative rotation with respect thereto, is a collar 20 having a radially extending passage 21 opening at its inner end into the recess 18 of the shaft 15. Suitably secured within the passage 21 is a fitting 22 for an air-line 23 connected to a source of compressed air through a conventional two-position control valve having pressure admitting and exhaust positions (the compressed air source and valve not being shown).

The rearward end of the connecting shaft 15 is externally threaded for engagement within an aperture 24 provided centrally in the face of a vertically disposed plate 25 having a forwardly projecting annular boss 26 abutting surface-wise against the end face of the collar 20. The plate 25 is turned rearwardly as at a in dished formation and at its margin is formed into an outturned flange 27 for registration with a corresponding flange 28 on a rear plate 29 of similar configuration as the plate 25, but having greater depth and an enlarged central aperture 30 aligned with the aperture 24 of the plate 25. Disposed between the plates 25, 29 is a membrane or diaphragm 31 fabricated preferably of rubber or other suitable elastic material, having apertures b adjacent its outer margin in alignment with registering apertures 32, 33 provided in the flanges 27, 28 of the plates 25, 29 respectively, for reception of threaded bolts 34. The diaphragm 31 thus divides the space within the plates 25, 29 into forward and rearward chambers 35, 36, it being noted that the chamber 35 is completely enclosed, whereas the chamber 36 is open to the atmosphere through the aperture 30 of the plate 29.

The diaphragm 31 is centrally provided with a suitable aperture 37 and is further provided, upon its rearwardly presented face, with a concentric rigid backing or support plate 38 formed of heavy gauge steel plate and having a central aperture 39 of the same diametral size as, and in registration with, the diaphragm aperture 37. Upon its forwardly presented face the diaphragm 31 is provided with a concentric pressure collar 40 which is also provided with an aperture 41, having the same diametral size as, and in registration with, the apertures 37 and 39, all as best seen in Figure 2 and for purposes presently more fully appearing.

Threadedly mounted in the plate 29 on diametrically opposite sides of the enlarged opening or aperture 30 are guide screws 42 which terminate rearwardly of the backing plate 38. Disposed encirclingly about and projecting forwardly from the guide screws 42 are compression springs 43 abutting at their rearward ends against the inner face of the plate 29 and at their forward ends against the rearwardly presented face of the backing plate 38, for spring loading the diaphragm 31.

Slidably mounted in and projecting co-axially from the tubular shaft 15 is a driving sleeve 44 which is diametrally turned down at the rearward end in the provision of an annular abutment shoulder 45 and a diametrally reduced tail portion 46 which extends snugly through the apertures 37, 39, 41 and its rearwardly projecting end is threaded for receiving a clamping nut 47.

Provided upon the outer face of the driving sleeve 44 adjacent its forward end is an annular groove 48 for receiving an annular gasket 49 which is somewhat smaller in cross-sectional size than the gaskets 17. Spaced rearwardly of the groove 48 on the outer face of the driving sleeve 44 is a shallow, relatively wide annular recess 50 opening into a rearwardly extending longitudinal recess 51 which, in turn, at its rearward end opens into the chamber 35. It should be noted that the annular recess 50 is in communication with the radial passage 19 of the shaft 15 for permitting introduction of compressed air or other motive-power fluid into the chamber 35.

The driving sleeve 44 is internally threaded as at 52 for a short distance forwardly from its rearward end and is then counter-bored to provide an intermediate clearance section 53 and a diametrally enlarged second or forward clearance section 54. Operatively mounted in the rearwardly extending internally threaded portion 52 of the driving sleeve 44 is an externally threaded adjustment quill 55 which, at its forward end, projects freely through the clearance portion 53 and a short distance into the clearance portion 54. At its opposite end the quill 55 projects rearwardly and adjacent its extremity is diametrally reduced and flatted upon its external face to provide a nut-like end section 56 positioned outwardly of the aperture or opening 30 so as to be accessible for gripping with a wrench, pliers, or other similar hand tool. Threaded upon the rearwardly projecting end of the quill 55 is a lock-nut 57 adapted for locking abutment against the rearwardly presented end face of the driving sleeve 44. Slidably mounted within and extending through the forward clearance portion 54 is a draw-bar 58 projecting at its forward end a short distance into the spindle bore 3 and being provided on such forwardly projecting end with an internal concentric tapped bore 59 for threadedly receiving a draw-bolt 60 which extends forwardly through the spindle bore 3 and is conventionally attached to a collet chuck, or other similar work-holding device (not shown). At its opposite end the draw-bar 58 is turned down in the provision of a shoulder c and a tail portion d for loose fitting slidable disposition within and through the adjustment quill 55 and at its rearward extremity projects outwardly there beyond and is externally threaded for receiving a locking nut 61 adapted for abutment against the rearwardly presented end face of the nut-like end section 56 of the quill 55.

In operation, a gear blank or similar work piece is placed within a collet or other suitable holding device. By operation of a valve (not shown) in the air line 23 compressed air is admitted into the chamber 35, where it exerts a rearward flexing pressure on the diaphragm 31 against the pressure of the springs 43. This rearward flexing of the diaphragm 31 causes the draw bar 58 and the draw bolt 60 attached thereto to be moved commensurately rearwardly pulling the collet rearwardly into locked or work-gripping position. It will be noted that upon rotation of the spindle 2, the entire collet chuck assembly rotates therewith, except for the collar member 20, which at all times remains stationary. To release the collet for removal of finished work, the operator turns the control valve to exhaust position permitting the air in the chamber 35 to be expelled under force of the springs 43. The draw bar 58 and draw bolt 60 thereupon move forwardly within the spindle 2 shifting the collet into so-called work-releasing position.

The relationship of the longitudinal travel accomplished by the draw bar 58 and draw bolt 60 to the spindle 2, during flexing and return action of the diaphragm 31 may be adjusted by backing off the lock-nuts 57, 61 to release the draw bar 58 and adjustment quill 55 for longitudinal movement, and the latter is threaded forwardly or rearwardly, as desired, within the driving sleeve 44. If, for example, it is desired to have the draw bar 58 and bolt 60 travel less distance beyond the forward end of the spindle 2, the adjustment quill 55 is threaded the necessary distance rearwardly, the nut 57 is tightened, the draw bar 58 is then pulled rearwardly until the shoulder c abuts against the end face of the quill 55, and then, finally, the nut 61 is tightened. This adjustability feature is of great importance since it permits control over the amount of relative travel between work-holding and work-releasing position, effecting an economy of time in overall production, as well as providing ready adaptability to a variety of machines. It is to be especially noted that collet chucks of varying sizes may be utilized as required for any particular operation without removing the draw bolt 60 and draw bar 58 since the collet chucks are merely threaded into the forward end of the draw bolt 60. Thus, it will be seen that this is a marked improvement over commonly used draw bolt assemblies which, of necessity, have the draw bolt threaded onto the collet chuck.

If desired, a modified type of collet chuck actuator may be provided which essentially incorporates a pair of plates 25', 25'', substantially identical with the plate 25 above described. The plates 25', 25'' are symmetrically arranged to permit the exertion of pressure on either side of a diaphragm 31' with attendant advantages as will be shown presently. The diaphragm 31' divides the space between the plates 25', 25'' into chambers 35', 35'', said diaphragm 31' being provided with forward and rearward backing or support plates 38', 38''. The plates 25', 25'' are threadedly secured to connecting shafts 15', 15'', respectively, which have collar members 20', 20'' disposed concentrically thereabout, respectively, said collar members 20', 20'' being connected to air lines 23', 23'' respectively. Suitably secured to the forward end of the shaft 15' is an adapter collar 7' engaged to the spindle adaptor collar 4. Threadedly engaged on the rearward end of the connecting shaft 15'' is an end stop collar 62 having a radial aperture 63 for receiving a set screw 64, said aperture 63 being provided with a thread protector 65. Extending through the bores of the connecting shafts 15', 15'' and suitable aligned centrally disposed apertures in the diaphragm 31' and backing or support plates 38', 38'' is an elongated driving sleeve 66 having an axial bore 67. Said sleeve 66 is integrally provided centrally with a collar 68 which is externally threaded for engagement within the central apertures of the diaphragm 31' and support plates 38', 38''. Adjacent each end of said driving sleeve 66 in the outer face thereof, there is provided an annular groove 69 within which is disposed a gasket 70. At its rearward end, the bore 67 of the driving sleeve 66 is threaded for engagement with an adjustment quill 55' having engaged thereon a lock-nut 57', similar in all respects to the quill 55 and lock-nut 57 respectively, above described. Slidably disposed within the bore 67 of the sleeve 66 is the forward portion of a draw bar 58', having a shoulder c' and a diametrally reduced rearward portion which projects through the bore of the quill 55' and is threaded for engagement with a lock-nut 61'.

The draw bar 58' is provided with a tapped bore 59' in the forward end face thereof for receiving the end of a draw bolt 60'.

In operation, air may be admitted into the chamber 35' to effect a rearward flexing of the diaphragm 31' with consequent rearward movement of the draw bolt 58', thus moving the collet chuck into work-holding position. Upon completion of the operation, air may then be admitted into the chamber 35'' to cause a forward flexing of the diaphragm 31' and thereby move the collet chuck forwardly into work releasing position. In the event the collet chuck should, inadvertently, become tightly wedged in its seat, an increased pressure, as necessary, may be released into the chamber 35'' to dislodge the collet chuck. It is to be noted that maximum efficiency is effected by this structure since the pressure of the air admitted into either chamber is almost completely utilized to flex the diaphragm 31' since such pressure is merely pushing against the near atmospheric pressure of the other chamber. Thus, the modified type of collet chuck actuator herein described provides means for positively moving the collet chuck into work-holding position and into work-releasing position. The fixed relationship of the draw bar 58' and the draw bolt 60' to the diaphragm 31' may be adjusted in the same manner as set forth above in connection with the draw bar 58 and draw bolt 60 and diaphragm 31.

If desired, the pneumatic pressure means described above may be replaced by hydraulic pressure means, and it should be understood that other similar changes and modifications in the form, construction, arrangement, and combination of the several parts of the collet chuck actuator may be made and substituted for those herein shown and described without departing from the nature and principle of my invention.

Having thus described my invention, what I claim and desire to secure by Letters Patent is:

1. A collet chuck actuator comprising a first plate member, a second plate member having a central opening, a flexible diaphragm disposed between said plate members and held in engagement with said plate members at the periphery of said plate members to thereby provide an enclosed chamber and an open chamber, a rigid support plate mounted on the outwardly presented face of the diaphragm, said diaphragm and support plate having aligned central apertures in axial alignment with the opening in the second plate, a driving sleeve extending through said aligned opening in the diaphragm and support plate, a clamping nut engaged upon the outer projecting end of said driving sleeve in tight abutment against the support plate, said driving sleeve being internally threaded adjacent its outer end, an adjustment quill threadedly engaged within the driving sleeve for selected relative axial positionment thereto, said quill projecting at its outer end beyond the outer end of the driving sleeve, a lock nut engaged upon the projecting end of said adjustment quill in tight abutment against the end face of the driving sleeve, a draw bar extending through said driving sleeve and adjustment quill and projecting beyond the outer end of the adjustment quill said draw bar having a diametrally decreased portion providing a shoulder for abutment against the inner end face of the adjustment quill, a lock nut secured upon the outer end of the draw bar in tight surface abutment against the end face of the adjustment quill whereby the draw bar may be longitudinally adjusted with relation to the diaphragm by adjusting the relative positions of the driving sleeve and the adjustment quill, a source of fluid under pressure, and means for admitting fluid into the enclosed chamber for flexing the diaphragm.

2. A collet chuck actuator comprising a first plate member, a second plate member having a central opening, a flexible diaphragm disposed between said first and second plate members and held in engagement with said plate members at the periphery of said plate members to thereby provide an open and a closed chamber, a rigid support plate mounted on the outwardly presented face of the diaphragm in tight surface abutment therewith, said support plate being of less diameter than the diaphragm, said diaphragm and support plate having aligned central apertures which are axially aligned with the central opening of the second plate member, a driving sleeve projecting at one of its ends through the central apertures of the diaphragm and support plate, said driving sleeve being of increased diameter spacedly from the diaphragm, a pressure collar disposed about said driving sleeve immediately between the increased diametral portion thereof and the diaphragm, said driving sleeve being internally and externally threaded at its projecting end, a clamping nut engaged upon the projecting end of said driving sleeve in tight abutment against the support plate, an externally threaded adjustment quill engaged within the driving sleeve and projecting outwardly therefrom, the portion of said adjustment quill within the driving sleeve being of less length than said sleeve, a lock nut engaged upon the projecting end of the adjustment quill in tight engagement against the end face of the driving sleeve, a draw bar disposed within the driving sleeve and having a diametrally decreased tail portion for projecting through the adjustment quill, the end face of the diametrally increased portion of the draw bar abutting against the inner end face of the adjustment quill, a nut engaged upon the projecting end of the draw bar for abutment against the end face of the adjustment quill whereby the draw bar may be adjusted longitudinally with relation to the diaphragm by the inward or outward adjusting movement of the quill, a source of fluid under pressure, and means for admitting fluid into the closed chamber for flexing the diaphragm.

3. A collet chuck actuator comprising a first plate member, a second plate member having a central opening, a flexible diaphragm disposed between said plate members and held in engagement with said plate members at the periphery of said plate members to thereby provide an enclosed chamber and an open chamber, a rigid support plate mounted on the outwardly presented face of the diaphragm, said diaphragm and support plate having aligned central apertures in axial alignment with the opening in the second plate, a driving sleeve extending through said aligned openings in the diaphragm and support plate, a clamping nut engaged upon the outer projecting end of said driving sleeve in tight abutment against the support plate, said driving sleeve being internally threaded adjacent its outer end, an adjustment quill threadedly engaged within the driving sleeve and projecting at its outer end beyond the outer end of the driving sleeve, a lock nut engaged upon the projecting end of said adjustment quill in tight abutment against the end face of the driving sleeve, a draw bar extending through said driving sleeve and adjustment quill and projecting beyond the outer end of the adjustment quil, said draw bar having a diametrally decreased portion providing a shoulder for abutment against the inner end face of the adjustment quill spring members mounted on the second plate member and bearing freely against the support plate, a source of fluid under pressure, means for directing said fluid into the enclosed chamber to flex the diaphragm against the counter pressure of the spring members to effect axial movement of the driving sleeve, adjustment quill, and draw bar, a source of fluid under pressure, and means for admitting fluid into the enclosed chamber for flexing the diaphragm.

4. A collet chuck actuator comprising a first plate member, a second plate member having a central opening, a flexible diaphragm disposed between said first and second plate members and held in engagement with said plate members at the periphery of said plate members to thereby provide an open and closed chamber, a rigid support plate mounted on the outwardly presented face of the diaphragm in tight surface abutment therewith, said support plate being of less diameter than the diaphragm, said diaphragm and support plate having aligned central apertures which are axially aligned with the central opening of the central plate member, a driving sleeve projecting at one of its ends through the central apertures of the diaphragm and support plate, said driving sleeve being of increased diameter spacedly from the diaphragm, a pressure collar disposed about said driving sleeve immediately between the increased diametral portion thereof and the diaphragm, said driving sleeve being internally and externally threaded at its projecting end, a clamping nut engaged upon the projecting end of said driving sleeve in tight abutment against the support plate, an externally threaded adjustment quill engaged within the driving sleeve and projecting outwardly therefrom, the portion of said adjustment quill within the driving sleeve being of less length than said sleeve, a lock nut engaged upon the projecting end of the adjustment quill in tight engagement against the end face of the driving sleeve, a draw bar disposed within the driving sleeve and having a diametrally decreased tail portion for projecting through the adjustment quill, the end face of the diametrally increased portion of the draw bar abutting against the inner end face of the adjustment quill, guide screws projecting through said second plate member into the open chamber, spring members encirclingly disposed about the shanks of said guide screws and abutting freely at their ends against the support plate, said guide screws being so spaced as to permit the spring members to exert an evenly distributed pressure against the support plate and diaphragm, a source of fluid under pressure, means for directing said fluid into the enclosed chamber to flex the diaphragm against the counter pressure exerted by the spring members for axial movement of the draw bar, a source of fluid under pressure, and means for admitting fluid into the enclosed chamber for flexing the diaphragm.

5. A collet chuck actuator comprising a first plate member, a second plate member, each of said plate members having central openings, a flexible diaphragm disposed between said plate members and held in engagement with said plate members at the periphery of said plate members for defining a chamber on either side of said diaphragm, rigid support plates mounted on the faces of the diaphragm, said diaphragm and support plates having aligned central apertures in axial alignment with the openings in the first and second plates, a driving sleeve extending through said aligned openings in the diaphragm and support plates, said driving sleeve being internally threaded adjacent its outer end, an adjustment quill threadedly engaged within the driving sleeve, a lock nut engaged upon the projecting end of said adjustment quill in tight abutment against the end face of the driving sleeve, a draw bar within said driving sleeve and adjustment quill and projecting beyond the outer end of the adjustment quill, a lock nut secured upon the outer end of the draw bar in tight surface abutment against the end face of the adjustment quill whereby the draw bar may be longitudinally adjusted with relation to the diaphragm by adjusting the relative positions of the driving sleeve and the adjustment quill, a source of fluid under pressure, and means for admitting fluid to at least one chamber.

6. A collet chuck actuator comprising a first plate member, a second plate member, each of said plate members having central openings, a flexible diaphragm disposed between said plate members and held in engagement with said plate members at the periphery of said plate members for defining a chamber on either side of said diaphragm, a support plate mounted on the faces of the diaphragm, said diaphragm and support plates having aligned central apertures in axial alignment with the openings in the first and second plate, a driving sleeve extending through said aligned openings in the diaphragm and support plates, said driving sleeve being internally threaded adjacent its outer end, an adjustment quill threadedly engaged within the driving sleeve and projecting outwardly therefrom, the portion of said adjustment quill within the driving sleeve being of less length than said sleeve, a clamping nut engaged upon the projecting end of the adjustment quill in tight engagement against the end face of the driving sleeve, a draw bar disposed within the driving sleeve and having a diametrally decreased tail portion for projecting through the adjustment quill, the end face of the diametrally increased portion of the draw bar abutting against the inner end face of the adjustment quill, a nut engaged upon the projecting end of the draw bar for abutment against the end face of the adjustment quill whereby the draw bar may be adjusted longitudinally with relation to the diaphragm by the inward or outward adjusting movement of the quill, a source of fluid under pressure, and means for admitting fluid to at least one chamber.

7. A collet chuck actuator comprising in combination with chamber-forming members and a flexible diaphragm disposed therebetween and held in engagement with said chamber-forming members at the periphery of said chamber-forming members, said diaphragm being provided with a central opening, a driving sleeve extending through the opening in the diaphragm, means for maintaining said driving sleeve in fixed relation to said diaphragm, said driving sleeve being internally threaded adjacent its outer projecting end, an adjustment quill threadedly engageable within the driving sleeve for selected relative axial positionment thereto, said quill projecting at its outer end beyond the outer end of the driving sleeve, means engageable upon the adjustment quill for maintaining same in selected relative position with respect to the driving sleeve, a drawbar within said driving sleeve and adjustment quill and projecting beyond the outer end of the adjustment quill, said drawbar being contoured to provide a surface for abutment aaginst the inner end face of the adjustment quill, means engageable upon the projecting end of the drawbar for abutment against the outer end face of the adjustment quill, a source of fluid under pressure, and means for admitting fluid into at least one of the chambers defined by the chamber-forming members and the diaphragm.

8. A collet chuck actuator comprising first and second plate members, a flexible diaphragm disposed between said plate members and held in engagement with said plate members at the periphery of said members, a backing plate mounted on one face of the diaphragm, said diaphragm and backing plate having aligned apertures, a driving sleeve extending through said aligned openings in the diaphragm and backing plate, locking means engaging on the outer projecting end of the driving sleeve, said driving sleeve being internally threaded adjacent its outer projecting end, an adjustment quill threadedly engageable within the driving sleeve and projecting at its outer end beyond the outer end of said sleeve, locking means engageable upon the projecting end portion of the adjustment quill to maintain same in fixed relation to the driving sleeve, a drawbar extending through said driving sleeve and adjustment quill and projecting beyond the outer end of the quill, said drawbar having a diametrally reduced portion to provide an annular shoulder for abutment against the inner end face of the adjustment quill, locking means engageable upon the outer end of the drawbar for maintaining the adjustment quill in tight surface abutment against the shoulder of the drawbar whereby the drawbar may be longitudinally adjusted with relation to the diaphragm by adjusting the relative positions of the driving sleeve and the adjustment quill, a source of fluid under pressure, and means for directing said fluid against at least one face of said diaphragm for flexing same.

9. A collet chuck actuator comprising a first plate member, a second plate member having a central opening, a flexible diaphragm disposed between said first and second plate members and held in engagement with said plate members at the periphery of said plate members to thereby provide an open and closed chamber, a backing plate mounted on the outwardly presented face of the diaphragm, said diaphragm and support plate having aligned central apertures, a driving sleeve projecting at one of its ends through the central apertures of the diaphragm and backing plate and into the open chamber, said driving sleeve being of increased diameter spacedly from the inwardly presented face of the diaphragm, a pressure collar encirclingly mounted on said driving sleeve for disposition between the diaphragm and the increased diametral portion of the sleeve, said driving sleeve being internally and externally threaded at its outer projecting end, a clamping member engaged upon the projecting end of said driving sleeve for abutment against the backing plate, an externally threaded adjustment quill engageable within the driving sleeve for projection outwardly at one of its ends beyond the outer end of the sleeve, locking means engageable upon the projecting end of the adjustment quill for maintaining same in selected position with reference to the driving sleeve, a drawbar disposed within the driving sleeve for sliding movement therein, said drawbar being diametrally decreased to form an annular shoulder and a tail portion, said tail portion extending through the adjustment quill and projecting at its outer end beyond the outer end thereof, said shoulder abutting against the inner end face of the adjustment quill, a nut engageable upon the projecting end of the tail portion of the drawbar for abutment against the outer end face of the adjustment quill, whereby the drawbar may be adjusted longitudinally with relation to the diaphragm by the inward or outward adjusting movement of the quill, a source of fluid under pressure, and means for admitting fluid into the closed chamber for flexing the diaphragm.

WM. G. von WEISE.

References Cited in the file of this patent

UNITED STATES PATENTS

| Number | Name | Date |
|---|---|---|
| 1,098,025 | Domizi | May 26, 1914 |
| 1,299,883 | Warren | Apr. 8, 1919 |
| 2,146,092 | Raymond | Feb. 7, 1939 |
| 2,213,663 | Berard | Sept. 3, 1940 |
| 2,262,825 | Welliver | Nov. 18, 1941 |
| 2,291,147 | Carlsen | July 28, 1942 |
| 2,415,181 | Johnson | Feb. 4, 1947 |
| 2,425,928 | Emerson | Aug. 19, 1947 |
| 2,477,773 | Soussloff et al. | Aug. 2, 1949 |
| 2,504,186 | De Munck | Apr. 18, 1950 |
| 2,509,673 | Church | May 30, 1950 |
| 2,515,183 | Benjamin et al. | July 18, 1950 |
| 2,565,430 | Hohwart et al. | Aug. 21, 1951 |